(12) United States Patent
Nakajima et al.

(10) Patent No.: US 9,273,200 B2
(45) Date of Patent: Mar. 1, 2016

(54) PROPYLENE POLYMER COMPOSITION AND MOLDED ARTICLE THEREOF

(71) Applicant: Sumitomo Chemical Company, Limited, Tokyo (JP)

(72) Inventors: Hiroyoshi Nakajima, Tokyo (JP); Shunsuke Chiba, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/360,781

(22) PCT Filed: Nov. 29, 2012

(86) PCT No.: PCT/JP2012/081592
§ 371 (c)(1),
(2) Date: May 27, 2014

(87) PCT Pub. No.: WO2013/081181
PCT Pub. Date: Jun. 6, 2013

(65) Prior Publication Data
US 2014/0256869 A1      Sep. 11, 2014

(30) Foreign Application Priority Data

Nov. 30, 2011   (JP) ................................ 2011-261479

(51) Int. Cl.
| | |
|---|---|
| C08L 23/12 | (2006.01) |
| C08K 5/00 | (2006.01) |
| C08L 23/10 | (2006.01) |
| C09D 5/00 | (2006.01) |
| G02B 5/26 | (2006.01) |
| C09D 7/12 | (2006.01) |

(52) U.S. Cl.
CPC . *C08L 23/12* (2013.01); *C08K 5/00* (2013.01); *C08L 23/10* (2013.01)

(58) Field of Classification Search
CPC ........... C08L 23/12; C08L 23/10; C08K 5/00; C09D 5/00; C09D 7/12; G02B 5/26
USPC ................... 524/528, 449; 136/259; 359/350; 523/135
See application file for complete search history.

(56) References Cited

U.S. PATENT DOCUMENTS

| | | | |
|---|---|---|---|
| 6,110,986 A | 8/2000 | Nozawa et al. | |
| 6,156,844 A | 12/2000 | Hashimoto et al. | |
| 6,251,997 B1 | 6/2001 | Imai et al. | |
| 6,300,415 B1 | 10/2001 | Okayama et al. | |
| 6,319,991 B1 * | 11/2001 | Okayama .............. | C08L 23/142 524/108 |
| 6,346,580 B1 | 2/2002 | Fujita et al. | |
| 2004/0249031 A1 | 12/2004 | Sadamitsu et al. | |
| 2006/0135672 A1 | 6/2006 | Kanzaki | |
| 2009/0048404 A1 | 2/2009 | Kishiro et al. | |

FOREIGN PATENT DOCUMENTS

| | | | |
|---|---|---|---|
| JP | H08-197640 A | | 8/1996 |
| JP | 09176406 A | * | 7/1997 |
| JP | H09-176406 A | | 7/1997 |
| JP | 2008-115262 A | | 5/2008 |
| JP | 2008-255191 A | | 10/2008 |
| SG | 172306 A1 | | 7/2011 |

OTHER PUBLICATIONS

Int'l Search Report issued on Jan. 8, 2013 in Int'l Application No. PCT/JP2012/081592.

* cited by examiner

*Primary Examiner* — Michael M Bernshteyn
(74) *Attorney, Agent, or Firm* — Panitch Schwarze Belisario & Nadel LLP

(57) ABSTRACT

The present invention provides a propylene polymer molded article being high in tensile elongation and scratch resistance and a propylene polymer composition capable of affording such a molded article. Specifically, the present invention provides, in one embodiment thereof, a propylene polymer composition comprising a propylene polymer (A-1) that is a polymer having an intrinsic viscosity, as measured in tetralin at 135° C., of from 1.2 dl/g, inclusive, to 1.7 dl/g, exclusive, or a propylene polymer (A-2) that is a polymer having an intrinsic viscosity, as measured in tetralin at 135° C., of from 1.7 dl/g, inclusive, to 2.9 dl/g, inclusive, a propylene polymer (B) that is a polymer having an intrinsic viscosity, as measured in tetralin at 135° C., of from 0.5 dl/g, inclusive, to 1.1 dl/g, exclusive, and a nucleating agent.

2 Claims, No Drawings

PROPYLENE POLYMER COMPOSITION AND MOLDED ARTICLE THEREOF

CROSS-REFERENCE TO RELATED APPLICATION

This application is a Section 371 of International Application No. PCT/JP2012/081592, filed Nov. 29, 2012, which was published in the Japanese language on Jun. 6, 2013, under International Publication No. WO 2013/081181 A1, and the disclosure of which is incorporated herein by reference.

TECHNICAL FIELD

The present invention relates to propylene polymer compositions and molded articles thereof. Particularly, the invention relates to a propylene polymer molded article that comprises a propylene polymer as a main ingredient and is high in tensile elongation and scratch resistance and to a propylene polymer composition capable of affording such a molded article.

BACKGROUND ART

Molded articles obtained by molding propylene polymer compositions are used for automotive materials or household appliance materials.

For example, Patent Document 1 discloses a polypropylene-based resin composition for foam applications comprising a resin composition comprising at least one propylene polymer selected from the group consisting of a propylene homopolymer and a propylene-ethylene copolymer and an ethylene-α-olefin copolymer, and a β crystal nucleating agent.

Patent Document 2 discloses a polyolefin resin molded article characterized in that the crystal conformation in a propylene-based polymer phase in a polyolefin resin molded article is one formed of crystal lamella layers piled in layer and that the direction in which the long period regularity of the crystal lamella layers is formed is almost perpendicular to the direction in which the resin flows during the formation of the molded article.

PRIOR ART DOCUMENTS

Patent Documents

Patent Document 1: JP-A-2008-255191
Patent Document 2: JP-A-8-197640

SUMMARY OF THE INVENTION

Problems to be Solved by the Invention

However, there is room for improvement in the scratch resistance of the propylene-based resin composition and the polyolefin resin molded article disclosed in these documents.

In view of the above-described problems, an object of the present invention is to provide a propylene polymer molded article high in tensile elongation and scratch resistance and a propylene polymer composition capable of affording such a propylene polymer molded article.

Means for Solving the Problems

The above problems to be solved by the present invention have been solved by the following means.

A propylene polymer composition comprising a propylene polymer (A-1) or propylene polymer (A-2) defined below, a propylene polymer (B), and a nucleating agent (C), wherein the content of the propylene polymer (A-1) is 99.95 parts by weight to 55 parts by weight, the content of the propylene polymer (B) is 0.05 parts by weight to 45 parts by weight, and the content of the nucleating agent (C) is 0.001 parts by weight to 5 parts by weight, or the content of the propylene polymer (A-2) is 99.95 parts by weight to 30 parts by weight, the content of the propylene polymer (B) is 0.05 parts by weight to 70 parts by weight, and the content of the nucleating agent (C) is 0.001 parts by weight to 5 parts by weight where the total amount of the propylene polymer (A-1) or propylene polymer (A-2) and the propylene polymer (B) is taken as 100 parts by weight,

[Propylene Polymer (A-1)]
a polymer comprising not less than 90% by weight of monomer units derived from propylene where the whole amount of the polymer is taken as 100% by weight, and having an intrinsic viscosity, as measured in tetralin at 135° C., of from 1.2 dl/g, inclusive, to 1.7 dl/g, exclusive;

[Propylene Polymer (A-2)]
a polymer comprising not less than 90% by weight of monomer units derived from propylene where the whole amount of the polymer is taken as 100% by weight, and having an intrinsic viscosity, as measured in tetralin at 135° C., of from 1.7 dl/g, inclusive, to 2.9 dl/g, inclusive;

[Propylene Polymer (B)]
a polymer comprising not less than 90% by weight of monomer units derived from propylene where the whole amount of the polymer is taken as 100% by weight, and having an intrinsic viscosity, as measured in tetralin at 135° C., of from 0.5 dl/g, inclusive, to 1.1 dl/g, exclusive.

Effect of the Invention

According to the present invention, it is possible to provide a propylene polymer molded article high in tensile elongation and scratch resistance and a propylene polymer composition capable of affording such a propylene polymer molded article.

Mode for Carrying Out the Invention

[Propylene Polymer Composition]
The propylene polymer composition according to the present invention is a composition having the configuration described below.

A propylene polymer composition comprising a propylene polymer (A-1) or propylene polymer (A-2) defined below, a propylene polymer (B), and a nucleating agent (C), wherein the content of the propylene polymer (A-1) is 99.95 parts by weight to 55 parts by weight, the content of the propylene polymer (B) is 0.05 parts by weight to 45 parts by weight, and the content of the nucleating agent (C) is 0.001 parts by weight to 5 parts by weight, or the content of the propylene polymer (A-2) is 99.95 parts by weight to 30 parts by weight, the content of the propylene polymer (B) is 0.05 parts by weight to 70 parts by weight, and the content of the nucleating agent (C) is 0.001 parts by weight to 5 parts by weight where the total amount of the propylene polymer (A-1) or propylene polymer (A-2) and the propylene polymer (B) is taken as 100 parts by weight,

[Propylene Polymer (A-1)]
a polymer comprising not less than 90% by weight of monomer units derived from propylene where the whole amount of the polymer is taken as 100% by weight, and having an intrinsic viscosity, as measured in tetralin at 135° C., of from 1.2 dl/g, inclusive, to 1.7 dl/g, exclusive;

[Propylene Polymer (A-2)]

a polymer comprising not less than 90% by weight of monomer units derived from propylene where the whole amount of the polymer is taken as 100% by weight, and having an intrinsic viscosity, as measured in tetralin at 135° C., of from 1.7 dl/g, inclusive, to 2.9 dl/g, inclusive;

[Propylene Polymer (B)]

a polymer comprising not less than 90% by weight of monomer units derived from propylene where the whole amount of the polymer is taken as 100% by weight, and having an intrinsic viscosity, as measured in tetralin at 135° C., of from 0.5 dl/g, inclusive, to 1.2 dl/g, exclusive.

The components will be described below.

[Propylene Polymer (A-1)]

The propylene polymer (A-1) in the present invention is a polymer comprising a monomer unit derived from propylene in an amount of 90% by weight or more where the overall amount of the polymer is taken as 100% by weight, and specific examples thereof include a propylene homopolymer and a random copolymer of propylene with at least one comonomer (hereinafter referred to as a propylene random copolymer). These may be used either individually or in combination.

Examples of the propylene random copolymer include random copolymers composed of monomer units derived from propylene and monomer units derived from at least one comonomer selected from the group consisting of ethylene and α-olefins having 4 or more carbon atoms and more specifically include a random copolymer composed of monomer units derived from propylene and monomer units derived from ethylene; a random copolymer composed of monomer units derived from propylene and monomer units derived from at least one α-olefin having 4 or more carbon atoms; and a random copolymer composed of monomer units derived from propylene, monomer units derived from ethylene and monomer units derived from at least one α-olefin having 4 or more carbon atoms.

The α-olefin having 4 or more carbon atoms which constitutes the propylene random copolymer is preferably an α-olefin having 4 to 10 carbon atoms, examples of which include 1-butene, 1-pentene, 1-hexene, 4-methyl-1-heptene, 1-octene and 1-decene, and is preferably 1-butene, 1-hexene or 1-octene.

Examples of the random copolymer composed of monomer units derived from propylene and monomer units derived from at least one α-olefin having 4 or more carbon atoms include propylene-1-butene random copolymers, propylene-1-hexene random copolymers, propylene-1-octene random copolymers, and propylene-1-decene random copolymers.

Examples of the random copolymer composed of monomer units derived from propylene, monomer units derived from ethylene and monomer units derived from at least one α-olefin having 4 or more carbon atoms include propylene-ethylene-1-butene copolymers, propylene-ethylene-1-hexene copolymers, propylene-ethylene-1-octene copolymers, and propylene-ethylene-1-decene copolymers.

The content of the monomer units derived from at least one comonomer selected from the group consisting of ethylene and α-olefins having 4 or more carbon atoms in the propylene random copolymer is preferably 0.1% by weight or more, more preferably 2% by weight or more, and preferably 10% by weight or less, more preferably 8% by weight or less, even more preferably 6% by weight or less, and it is, for example, within the range of 0.1 to 10% by weight, or within the range of 0.1 to 8% by weight, or within the range of 2 to 6% by weight. The content of the monomer units derived from propylene is preferably 99.9% by weight or less, more preferably 98% by weight or less, and preferably 90% by weight or more, more preferably 92% by weight or more, even more preferably 94% by weight or more, and it is, for example, within the range of 99.9 to 90% by weight, or within the range of 99.9 to 92% by weight, or within the range of 98 to 94% by weight. The contents of these monomer units can be determined by infrared absorption spectrometry.

The intrinsic viscosity of the propylene polymer (A-1) as measured in tetralin at 135° C. is from 1.2 dl/g, inclusive, to 1.7 dl/g, exclusive, and the intrinsic viscosity is preferably 1.4 dl/g or more, more preferably 1.5 dl/g or more, even more preferably less than 1.7 dl/g, and preferably 1.6 dl/g or less, and it is, for example, within the range of from 1.4 dl/g, inclusive, to 1.7 dl/g, exclusive, or within the range of from 1.5 dl/g, inclusive, to 1.7 dl/g, exclusive.

[Propylene Polymer (A-2)]

The propylene polymer (A-2) in the present invention is a polymer comprising a monomer unit derived from propylene in an amount of 90% by weight or more where the overall amount of the polymer is taken as 100% by weight, and specific examples thereof include a propylene homopolymer and a random copolymer of propylene with at least one comonomer (hereinafter referred to as a propylene random copolymer). These may be used either individually or in combination.

Examples of the propylene random copolymer include random copolymers composed of monomer units derived from propylene and monomer units derived from at least one comonomer selected from the group consisting of ethylene and α-olefins having 4 or more carbon atoms and more specifically include a random copolymer composed of monomer units derived from propylene and monomer units derived from ethylene; a random copolymer composed of monomer units derived from propylene and monomer units derived from at least one α-olefin having 4 or more carbon atoms; and a random copolymer composed of monomer units derived from propylene, monomer units derived from ethylene and monomer units derived from at least one α-olefin having 4 or more carbon atoms.

The α-olefin having 4 or more carbon atoms which constitutes the propylene random copolymer is preferably an α-olefin having 4 to 10 carbon atoms, examples of which include 1-butene, 1-pentene, 1-hexene, 4-methyl-1-heptene, 1-octene and 1-decene, and is preferably 1-butene, 1-hexene or 1-octene.

Examples of the random copolymer composed of monomer units derived from propylene and monomer units derived from at least one α-olefin having 4 or more carbon atoms include propylene-1-butene random copolymers, propylene-1-hexene random copolymers, propylene-1-octene random copolymers, and propylene-1-decene random copolymers.

Examples of the random copolymer composed of monomer units derived from propylene, monomer units derived from ethylene and monomer units derived from at least one α-olefin having 4 or more carbon atoms include propylene-ethylene-1-butene copolymers, propylene-ethylene-1-hexene copolymers, propylene-ethylene-1-octene copolymers, and propylene-ethylene-1-decene copolymers.

The content of the monomer units derived from at least one comonomer selected from the group consisting of ethylene and α-olefins having 4 or more carbon atoms in the propylene random copolymer is preferably 0.1% by weight or more, more preferably 2% by weight or more, and preferably 10% by weight or less, more preferably 8% by weight or less, even more preferably 6% by weight or less, and it is, for example, within the range of 0.1 to 10% by weight, or within the range of 0.1 to 8% by weight, or within the range of 2 to 6% by weight. The content of the monomer units derived from propylene is preferably 99.9% by weight or less, more preferably 98% by weight or less, and preferably 90% by weight or more, more preferably 92% by weight or more, even more preferably 94% by weight or more, and it is, for example, within the range of 99.9 to 90% by weight, or within the range of 99.9 to 92% by weight, or within the range of 98 to 94% by weight. The contents of these monomer units can be determined by infrared absorption spectrometry.

The intrinsic viscosity of the propylene polymer (A-2) as measured in tetralin at 135° C. is from 1.7 dl/g, inclusive, to 2.9 dl/g, inclusive, and the intrinsic viscosity is preferably 1.9 dl/g or more, and preferably 2.7 dl/g or less, more preferably 2.5 dl/g or less, even more preferably 2.4 dl/g or less, and it is, for example, within the range of from 1.7 dl/g, inclusive, to 2.7 dl/g, inclusive, or within the range of from 1.9 dl/g, inclusive, to 2.4 dl/g, inclusive.

[Propylene Polymer (B)]

The propylene polymer (B) in the present invention is a polymer comprising a monomer unit derived from propylene in an amount of 90% by weight or more where the overall amount of the polymer is taken as 100% by weight, and specific examples thereof include a propylene homopolymer and a random copolymer of propylene with at least one comonomer (hereinafter referred to as a propylene random copolymer). These may be used either individually or in combination.

Examples of the propylene random copolymer include random copolymers composed of monomer units derived from propylene and monomer units derived from at least one comonomer selected from the group consisting of ethylene and α-olefins having 4 or more carbon atoms and more specifically include a random copolymer composed of monomer units derived from propylene and monomer units derived from ethylene; a random copolymer composed of monomer units derived from propylene and monomer units derived from at least one α-olefin having 4 or more carbon atoms; and a random copolymer composed of monomer units derived from propylene, monomer units derived from ethylene and monomer units derived from at least one α-olefin having 4 or more carbon atoms.

The α-olefin having 4 or more carbon atoms which constitutes the propylene random copolymer is preferably an α-olefin having 4 to 10 carbon atoms, examples of which include 1-butene, 1-pentene, 1-hexene, 4-methyl-1-heptene, 1-octene and 1-decene, and is preferably 1-butene, 1-hexene or 1-octene.

Examples of the random copolymer composed of monomer units derived from propylene and monomer units derived from at least one α-olefin having 4 or more carbon atoms include propylene-1-butene random copolymers, propylene-1-hexene random copolymers, propylene-1-octene random copolymers, and propylene-1-decene random copolymers.

Examples of the random copolymer composed of monomer units derived from propylene, monomer units derived from ethylene, and monomer units derived from at least one α-olefin having 4 or more carbon atoms include propylene-ethylene-1-butene copolymers, propylene-ethylene-1-hexene copolymers, propylene-ethylene-1-octene copolymers, and propylene-ethylene-1-decene copolymers.

The content of the monomer units derived from at least one comonomer selected from the group consisting of ethylene and α-olefins having 4 or more carbon atoms in the propylene random copolymer is preferably 0.1% by weight or more, more preferably 2% by weight or more, whereas preferably 10% by weight or less, more preferably 8% by weight or less, even more preferably 6% by weight or less, and it is, for example, within the range of 0.1 to 10% by weight, or within the range of 0.1 to 8% by weight, or within the range of 2 to 6% by weight. The content of the monomer units derived from propylene is preferably 99.9% by weight or less, more preferably 98% by weight or less, and preferably 90% by weight or more, more preferably 92% by weight or more, even more preferably 94% by weight or more, and it is, for example, within the range of 99.9 to 90% by weight, or within the range of 99.9 to 92% by weight, or within the range of 98 to 94% by weight. The contents of these monomer units can be determined by infrared absorption spectrometry.

The intrinsic viscosity of the propylene polymer (B) as measured in tetralin at 135° C. is from 0.5 dl/g, inclusive, to 1.1 dl/g, exclusive, and the intrinsic viscosity is preferably 0.7 dl/g or more, more preferably 0.8 dl/g or more, and preferably 1.0 dl/g or less, and it is, for example, within the range of from 0.7 dl/g, inclusive, to 1.1 dl/g, exclusive, or within the range of from 0.8 dl/g, inclusive, to 1.0 dl/g, inclusive.

[Intrinsic Viscosity of Propylene Polymer]

The intrinsic viscosity (unit: dl/g) referred to in the present invention is a value measured by the method described below at a temperature of 135° C. using tetralin as a solvent.

A reduced viscosity is measured at three concentrations of 0.1 g/dl, 0.2 g/dl and 0.5 g/dl with an Ubbelohde's viscometer. The intrinsic viscosity is calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, by an extrapolation method in which reduced viscosities are plotted against concentrations and the concentration is extrapolated to zero.

[Method for Producing Propylene Polymer]

The propylene polymer can be produced by the method described below using a polymerization catalyst.

Examples of the polymerization catalyst include Ziegler type catalyst systems, Ziegler-Natta type catalyst systems, catalyst systems composed of an alkyl aluminoxane and a compound of a transition metal of Group 4 of the periodic table which compound has a cyclopentadienyl ring, catalyst systems composed of an organoaluminum compound, a compound of a transition metal of Group 4 of the periodic table which compound has a cyclopentadienyl ring, and a compound capable of reacting with the compound of the transition metal to form an ionic complex, and catalyst systems prepared by modifying catalyst components such as a compound of a transition metal of Group 4 of the periodic table which compound has a cyclopentadienyl ring, a compound capable of forming an ionic complex, and an organoaluminum compound by supporting them on inorganic particles such as silica and clay mineral. Preliminarily polymerized catalysts which are prepared by preliminarily polymerizing ethylene or an α-olefin in the presence of the aforementioned catalyst systems may also be used.

Specific examples of the catalyst systems include the catalyst systems disclosed in JP-A-61-218606, JP-A-5-194685, JP-A-7-216017, JP-A-9-316147, JP-A-10-212319, and JP-A-2004-182981.

Examples of the polymerization method include bulk polymerization, solution polymerization, slurry polymerization, and vapor phase polymerization. The bulk polymerization is a method in which polymerization is carried out using, as a medium, an olefin that is liquid at the polymerization temperature, and the solution polymerization or the slurry polymerization is a method in which polymerization is carried out in an inert hydrocarbon solvent such as propane, butane, isobutane, pentane, hexane, heptane, and octane. The gas phase polymerization is a method in which a gaseous monomer is used as a medium and a gaseous monomer is polymerized in the medium.

Such polymerization methods may be conducted either in a batch system or in a multistage system using a plurality of polymerization reactors linked in series and these polymerization methods may be combined appropriately. From the industrial and economical point of view, a continuous vapor phase polymerization method or a bulk-vapor phase polymerization method in which a bulk polymerization method and a vapor phase polymerization method are conducted continuously is preferred.

The conditions of each polymerization step (polymerization temperature, polymerization pressure, monomer concentration, amount of catalyst to be charged, polymerization time, etc.) may be determined appropriately depending on the desired propylene polymer.

The adjustment of the intrinsic viscosity of the propylene polymer can be performed by, for example, adjusting the hydrogen concentration at the time of polymerization.

In the production of the propylene polymer, in order to remove a residual solvent contained in the propylene polymer or ultralow molecular weight oligomers by-produced during the production, the propylene polymer may be optionally dried at a temperature lower than the temperature at which the propylene polymer melts. Examples of the method of drying method include the methods disclosed in JP-A-55-75410 and Japanese Patent No. 2565753.

[Isotactic Pentad Fraction of Propylene Polymer]

From the viewpoint of the balance between the rigidity and the impact resistance of a polypropylene injection molded article, the propylene polymer preferably has an isotactic pentad fraction (sometimes written as [mmmm] fraction) measured by $^{13}$C-NMR of 0.97 or more, more preferably 0.98 or more.

The isotactic pentad fraction is a fraction of propylene monomer units which are present at the center of an isotactic chain in the form of a pentad unit, in other words, the center of a chain in which five propylene monomer units are meso-bonded successively, in the propylene polymer molecular chain as measured by a method disclosed in A. Zambelli et al., Macromolecules, 6, 925 (1973), namely, by use of $^{13}$C-NMR (NMR absorption peaks are assigned in accordance with the disclosure of Macromolecules, 8, 687 (1975)). This is a measure which indicates that the closer to 1 the isotactic pentad fraction of a propylene polymer is, the higher the regioregularity of the molecular structure of the propylene polymer is and the higher the crystallinity of the polymer is.

When the propylene polymer is a propylene random copolymer like that described above, a value measured for the chain of the propylene units in the copolymer is used.

[Nucleating Agent]

Specific examples of the nucleating agent to be used for the present invention include phthalocyanines such as copper phthalocyanine blue, quinacridones such as quinacridone and quinacridone quinone, metal salts such as calcium salts, magnesium salts, and barium salts of organic dibasic acids (e.g., calcium pimelate and calcium terephthalate), potassium 12-hydroxystearate, magnesium benzoate, magnesium succinate, and magnesium phthalate, aromatic sulfonic acid compounds such as sodium benzenesulfonate and sodium naphthalenesulfonate, di or triesters of di or tricarboxylic acids, tetraoxaspiro compounds, imidocarboxylic acid derivatives, two-component mixtures of an organic dibasic acid and an oxide, hydroxide, or salt of a metal of Group IIA of the periodic table, and amide compounds represented by the following formula (1). These can be used either individually or in a combination of two or more of them.

$$R^2—NHCO—R—CONH—R^3 \quad (1)$$

wherein $R^1$ is a saturated or unsaturated aliphatic dicarboxylic acid residue having 1 to 24 carbon atoms, a saturated or unsaturated alicyclic dicarboxylic acid residue having 4 to 28 carbon atoms or an aromatic dicarboxylic acid residue having 6 to 28 carbon atoms; $R^2$ and $R^3$ are the same or different and are each a cycloalkyl group having 3 to 18 carbon atoms or a group represented by formula (a), formula (b), formula (c), or formula (d),

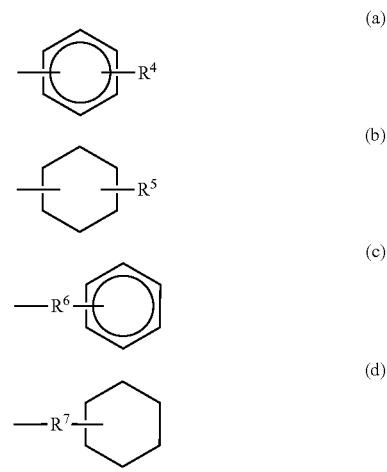

wherein $R^4$ represents a hydrogen atom, a linear or branched alkyl group having 1 to 12 carbon atoms, a cycloalkyl group having 6 to 10 carbon atoms, or a phenyl group; $R^5$ represents a linear or branched alkyl group having 1 to 12 carbon atoms; $R^6$ represents a linear or branched alkylene group having 1 to 4 carbon atoms; and $R^7$ represents a linear or branched alkylene group having 1 to 4 carbon atoms.

In the above formula (1), the aliphatic dicarboxylic acid residue is a residue obtained by removing two carboxyl groups from an aliphatic dicarboxylic acid. Examples of the aliphatic dicarboxylic acid include saturated or unsaturated aliphatic dicarboxylic acids having 3 to 26, preferably 3 to 14, carbon atoms, and more specifically include malonic acid, diphenylmalonic acid, succinic acid, phenylsuccinic acid, diphenylsuccinic acid, glutaric acid, 3,3-dimethylglutaric acid, adipic acid, pimelic acid, suberic acid, azelaic acid, sebacic acid, 1,12-dodecanedioic acid, 1,14-tetradecanedioic acid, and 1,18-octadecanedioic acid.

In the above formula (1), the alicyclic dicarboxylic acid residue is a residue obtained by removing two carboxyl groups from an alicyclic dicarboxylic acid. Examples of the alicyclic dicarboxylic acid include alicyclic dicarboxylic acids having 6 to 30, preferably 8 to 12, carbon atoms, and more specifically include 1,2-cyclohexanedicarboxylic acid, 1,4-cyclohexanedicarboxylic acid, and 1,4-cyclohexanediacetic acid.

In the above formula (1), the aromatic dicarboxylic acid residue is a residue obtained by removing two carboxyl groups from an aromatic dicarboxylic acid. Examples of the aromatic dicarboxylic acid include aromatic dicarboxylic acids having 8 to 30, preferably 8 to 22, carbon atoms, and more specifically include aromatic dibasic acids such as p-phenylenediacetic acid, p-phenylenediethanoic acid, phthalic acid, 4-tert-butylphthalic acid, isophthalic acid, 5-tert-butylisophthalic acid, terephthalic acid, 1,8-naphthalic acid, 1,4-naphthalenedicarboxylic acid, 2,6-naphthalenedicarboxylic acid, 2,7-naphthalenedicarboxylic acid, diphenic acid, 3,3'-biphenyldicarboxylic acid, 4,4'-biphenyldicarboxylic acid, 4,4'-binaphthyldicarboxylic acid, bis(3-carboxyphenyl)methane, bis(4-carboxyphenyl)methane, 2,2-bis(3-carboxyphenyl)propane, 2,2-bis(4-carboxyphenyl)propane, 3,3'-sulfonyldibenzoic acid, 4,4'-sulfonyldibenzoic acid, 3,3'-oxydibenzoic acid, 4,4'-oxydibenzoic acid, 3,3'-carbonyldibenzoic acid, 4,4'-carbonyldibenzoic acid, 3,3'-thiodibenzoic acid, 4,4'-thiodibenzoic acid, 4,4'-(p-phenylenedioxy)dibenzoic acid, 4,4'-isophtaloyldibenzoic acid, 4,4'-terephthaloyldibenzoic acid, and dithiosalicylic acid.

The amide compound of the above formula (1) is a compound obtained by making the above-mentioned dicarboxylic acid undergo amidation with an alicyclic monoamine and/or an aromatic monoamine in accordance with a publicly known method, for example, the method disclosed in JP-A-7-309821.

Examples of the alicyclic monoamine include cycloalkylamines having 3 to 18 carbon atoms, and compounds represented by formula (2):

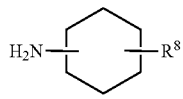

(2)

wherein $R^8$ is as defined above for $R^5$,
or by formula (3):

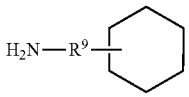

(3)

wherein $R^9$ is as defined above for $R^7$, and more specific examples thereof include cyclopropylamine, cyclobutylamine, cyclopentylamine, cyclohexylamine, 2-methylcyclohexylamine, 3-methylcyclohexylamine, 4-methylcyclohexylamine, 2-ethylcyclohexylamine, 4-ethylcyclohexylamine, 2-propylcyclohexylamine, 2-isopropylcyclohexylamine, 4-propylcyclohexylamine, 4-isopropylcyclohexylamine, 2-tert-butylcyclohexylamine, 4-n-butylcyclohexylamine, 4-isobutylcyclohexylamine, 4-sec-butylcyclohexylamine, 4-tert-butylcyclohexylamine, 4-n-amylcyclohexylamine, 4-isoamylcyclohexylamine, 4-sec-amylcyclohexylamine, 4-tert-amylcyclohexylamine, 4-hexylcyclohexylamine, 4-heptylcyclohexylamine, 4-octylcyclohexylamine, 4-nonylcyclohexylamine, 4-decylcyclohexylamine, 4-undecylcyclohexylamine, 4-dodecylcyclohexylamine, 4-cyclohexylcyclohexylamine, 4-phenylcyclohexylamine, cycloheptylamine, cyclododecylamine, cyclohexylmethylamine, α-cyclohexylethylamine, β-cyclohexylethylamine, α-cyclohexylpropylamine, β-cyclohexylpropylamine, and γ-cyclohexylpropylamine.

Examples of the aromatic monoamine include compounds represented by formula (4):

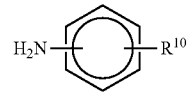

(4)

wherein $R^{10}$ is as defined above for $R^4$,
or by formula (5):

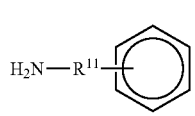

(5)

wherein $R^{11}$ is as defined above for $R^6$, and more specific examples thereof include aniline, o-toluidine, m-toluidine, p-toluidine, o-ethylaniline, p-ethylaniline, o-propylaniline, m-propylaniline, p-propylaniline, o-cumidine, m-cumidine, p-cumidine, o-tert-butylaniline, p-n-butylaniline, p-isobutylaniline, p-sec-butylaniline, p-tert-butylaniline, p-n-amylaniline, p-isoamylaniline, p-sec-amylaniline, p-tert-amylaniline, p-hexylaniline, p-heptylaniline, p-octylaniline, p-nonylaniline, p-decylaniline, p-undecylaniline, p-dodecylaniline, p-cyclohexylaniline, o-aminodiphenyl, m-aminodiphenyl, p-aminodiphenyl, benzylamine, α-phenylethylamine, β-phenylethylamine, α-phenylpropylamine, β-phenylpropylamine, and γ-phenylpropylamine.

Among the amide compounds represented by formula (1), preferred are compounds represented by formula (1) wherein $R^1$ is a saturated or unsaturated alicyclic dicarboxylic acid residue having 4 to 28 carbon atoms or an aromatic dicarboxylic acid residue having 6 to 28 carbon atoms, $R^2$ and $R^3$ are the same or different and are each a cycloalkyl group having 3 to 18 carbon atoms or a group represented by formula (a), formula (b), formula (c), or formula (d).

Moreover, among the amide compounds represented by formula (1), preferred are compounds represented by formula (1) wherein $R^1$ is a saturated or unsaturated alicyclic dicarboxylic acid residue having 6 to 10 carbon atoms or an aromatic dicarboxylic acid residue having 6 to 20 carbon atoms, $R^2$ and $R^3$ are the same or different and are each a cycloalkyl group having 6 to 10 carbon atoms or a group represented by formula (a), formula (b), formula (c), or formula (d), wherein $R^4$ represents a hydrogen atom, a linear or branched alkyl group having 1 to 4 carbon atoms, a cycloalkyl group having 6 to 8 carbon atoms, or a phenyl group; $R^5$ represents a linear or branched alkyl group having 1 to 4 carbon atoms, $R^6$ represents a linear or branched alkylene group having 1 to 4 carbon atoms, and $R^7$ represents a linear or branched alkylene group having 1 to 4 carbon atoms.

A compound is preferred wherein in formula (1), $R^1$ is an aromatic dicarboxylic acid residue having 6 to 28 carbon atoms, and $R^2$ and $R^3$ are the same or different and are each a group represented by a cycloalkyl group having 3 to 18 carbon atoms or a group represented by formula (b).

Among the amide compounds represented by the above formula (1), use of one whose melting point is 200° C. or more, especially 240° C. or more is advantageous.

Examples of particularly preferable amide compounds represented by formula (1) include N,N'-dicyclohexyl-4,4'-biphenyldicarboxyamide, N,N'-dicyclohexyl-2,6-naphthalenedicarboxyamide, and N,N'-dicyclohexylterephthalamide, and especially preferred among these is N,N'-dicyclohexyl-2,6-naphthalenedicarboxyamide.

[Other Ingredients]

The propylene polymer composition of the present invention may comprise a propylene block copolymer, an elastomer, and/or an inorganic filler.

Examples of the propylene block copolymer include a block copolymer composed of a propylene polymer component (I) comprising 90% by weight of more of monomer units derived from propylene, where the overall amount of the propylene polymer component (I) is taken as 100% by weight, and a copolymer component (II) of propylene with one or more olefins selected from the group consisting of ethylene and α-olefins having 4 to 10 carbon atoms, and specifically include a (propylene)-(propylene-ethylene) block copolymer, a (propylene)-(propylene-ethylene-1-butene) block copolymer, a (propylene-ethylene)-(propylene-ethylene) block copolymer, a (propylene-ethylene)-(propylene-ethylene-1-butene) block copolymer, and a (propylene-1-butene)-(propylene-1-butene) block copolymer. Preferred is a (propylene)-(propylene-ethylene) block copolymer.

Examples of the elastomer include an ethylene-propylene copolymer rubber, an ethylene-propylene-diene copolymer rubber, an ethylene-α-olefin copolymer rubber, a styrene-butadiene-styrene block copolymer rubber, a styrene-isoprene-styrene block copolymer rubber, and a styrene-ethylene-butylene-styrene block copolymer rubber, and these can be used either individually or in combination. Examples of the α-olefin include α-olefins having 4 to 10 carbon atoms, and preferred are 1-butene, 1-hexene, and 1-octene.

Examples of the inorganic filler include talc, calcium carbonate, mica, barium sulfate, calcium silicate, clay, magnesium carbonate, alumina, silica, and glass fiber. Talc is preferred as the inorganic filler.

The propylene polymer composition of the present invention may comprise an additive. Examples of the additive include a neutralizer, an antioxidant, a UV absorber, a nucleating agent other than that described above, a lubricant, an antistatic agent, an antiblocking agent, a processing aid, an organic peroxide, coloring agents (an inorganic pigment, an organic pigment, a pigment dispersant, etc.), a plasticizer, a flame retardant, an antibacterial agent, and a light diffusing agent. Such additives may be used either individually or in combination.

[Propylene Polymer Composition]

The propylene polymer composition according to the present invention comprises the above-described component (A-1) or component (A-2), the component (B), and the component (C). In the case where the composition comprises the component (A-1), when the total amount of the component (A-1) and the component (B) is taken as 100 parts by weight, the content of the component (A-1) is 99.95 to 55 parts by weight, preferably 95 parts by weight or less, more preferably 90 parts by weight or less, even more preferably 80 parts by weight or less, whereas preferably 60 parts by weight or more, more preferably 70 parts by weight or more and, for example, is within the range of 95 to 60 parts by weight or within the range of 80 to 70 parts by weight. The content of the component (B) is 0.05 to 45 parts by weight, preferably 5 parts by weight or more, more preferably 10 parts by weight or more, even more preferably 20 parts by weight or more, whereas preferably 40 parts by weight or less, more preferably 30 parts by weight or less and, for example, is within the range of 5 to 40 parts by weight or within the range of 20 to 30 parts by weight. The content of the component (C) is 0.001 to 5 parts by weight, preferably 0.005 parts by weight or more, more preferably 0.01 parts by weight or more, even more preferably 0.05 parts by weight or more, whereas preferably 5 parts by weight or less, more preferably 1 part by weight or less, even more preferably 0.5 parts by weight or less and, for example, is within the range of 0.01 to 1 part by weight or within the range of 0.05 to 0.5 parts by weight.

On the other hand, in the case where the composition comprises the component (A-2), when the total amount of the component (A-2) and the component (B) is taken as 100 parts by weight, the content of the component (A-2) is 99.95 to 30 parts by weight, preferably 95 parts by weight or less, more preferably 90 parts by weight or less, even more preferably 80 parts by weight or less, whereas preferably 30 parts by weight or more, more preferably 40 parts by weight or more, even more preferably 45 parts by weight or more, most preferably 50 parts by weight or more and, for example, is within the range of 95 to 40 parts by weight or within the range of 90 to 45 parts by weight or within the range of 80 to 50 parts by weight. The content of the component (B) is 0.05 to 70 parts by weight, preferably 5 parts by weight or more, more preferably 10 parts by weight or more, even more preferably 20 parts by weight or more, whereas preferably 70 parts by weight or less, more preferably 60 parts by weight or less, even more preferably 55 parts by weight or less, most preferably 50 parts by weight or less and, for example, is within the range of 5 to 60 parts by weight or within the range of 10 to 55 parts by weight or within the range of 20 to 50 parts by weight. The content of the component (C) is 0.001 to 5 parts by weight, preferably 0.005 parts by weight or more, more preferably 0.01 parts by weight or more, even more preferably 0.05 parts by weight or more, whereas preferably 5 parts by weight or less, more preferably 1 part by weight or less, even more preferably 0.5 parts by weight or less and, for example, is within the range of 0.01 to 1 part by weight or within the range of 0.05 to 0.5 parts by weight.

The MFR (measured in accordance with JIS K7210, at 230° C. and a load of 2.16 kgf) of the propylene polymer composition according to the present invention is preferably 5 to 200 g/10 minutes, more preferably 5 to 100 g/10 minutes, even more preferably 5 to 50 g/10 minutes, and most preferably 5 to 30 g/10 minutes. The MFR is an abbreviation of melt flow rate.

The propylene polymer composition of the present invention is obtained by melt-kneading the feed components preferably at 180° C. or more, more preferably at 180 to 300° C., more preferably at 220 to 280° C. For example, a Banbury mixer, a single screw extruder, or a co-rotating twin screw extruder can be used for the melt-kneading.

Examples of the shape of the propylene polymer composition include a strand shape, a sheet shape, a flat shape, and a pellet shape produced by cutting a strand into an appropriate length. In order to mold the propylene polymer composition of the present invention, the shape is preferably a pellet shape having a length of 1 to 50 mm from the viewpoint of the production stability of molded articles to be obtained.

The molded article to be obtained by molding the propylene polymer composition according to the present invention is preferably an injection molded article produced by injection molding. Examples of the injection molding include common injection molding, injection foam molding, supercritical injection foam molding, ultrahigh speed injection molding, injection compression molding, gas-assist injection molding, sandwich molding, sandwich foam molding, and insert/outsert molding.

Examples of the molded article include automotive materials, household appliance materials, and containers, and especially, the molded article is suitable as automotive materials.

EXAMPLES

The present invention is explained with reference to Examples and Comparative Examples below. The propylene polymers and the nucleating agent used in the Examples and the Comparative Examples are given below.
(1) Propylene Polymer (A)
(A-1) Propylene Homopolymer
MFR (230° C., 2.16 kg load): 20 g/10 minutes
Intrinsic viscosity: 1.32 dl/g
(A-2) Propylene Homopolymer
MFR (230° C., 2.16 kg load): 8 g/10 minutes
Intrinsic viscosity: 1.65 dl/g
(A-3) Propylene Homopolymer
MFR (230° C., 2.16 kg load): 2 g/10 minutes
Intrinsic viscosity: 2.12 dl/g
(A-4) Propylene Homopolymer
MFR (230° C., 2.16 kg load): 0.5 g/10 minutes
Intrinsic viscosity: 2.96 dl/g
(2) Propylene Polymer (B)
(B-1) Propylene Homopolymer
MFR (230° C., 2.16 kg load): 120 g/10 minutes
Intrinsic viscosity: 0.92 dl/g
(B-2) Propylene Homopolymer
MFR (230° C., 2.16 kg load): 350 g/10 minutes
Intrinsic viscosity: 0.75 dl/g
(3) Nucleating Agent (C)
(Commercial name) NJSTAR NU-100: produced by New Japan Chemical Co., Ltd.
(Chemical name) N,N'-dicyclohexyl-2,6-naphthalene dicarboxyamide Physical properties of raw material components and propylene polymer compositions were measured by the following methods.
(1) Melt Flow Rate (MFR)

Melt flow rate (unit: g/10 minutes) was measured in accordance with the method provided for in JIS K7210. Measurement was conducted at a temperature of 230° C. under a load of 2.16 kg.
(2) Intrinsic Viscosity ([η])

Reduced viscosities were measured at three concentrations of 0.1, 0.2 and 0.5 g/dl using an Ubbelohde's viscometer. The intrinsic viscosity (unit: dl/g) was determined, as described above, by an extrapolation method in which reduced viscosities are plotted against concentrations and the concentration is extrapolated to zero.
(3) Tensile Elongation Injection molding was performed at a molding temperature of 220° C. and a mold temperature of 70° C. by using an injection molding machine SI30III manufactured by Toyo Machinery & Metal Co., Ltd., yielding a 2 mm thick tensile test specimen. Two parallel lines were drawn on the center portion of the specimen along the width direction of the specimen over the entire width of the specimen at an interval of 25 mm taken in the longitudinal direction of the specimen, and then the specimen was pulled along its longitudinal direction with a tensile tester at a temperature of 23° C. and a tensile speed of 10 mm/minute until the specimen was broken. A tensile elongation (unit: %) defined by the ratio of the distance between the lines taken when the specimen broke to the initial distance between the lines (i.e., 25 mm) was calculated.
(4) Scratch Resistance On the above-described tensile test specimen (thickness: 2 mm), a load varying from 2 to 30 N was applied continuously to a metal core (diameter: 1 mm) in accordance with ASTM 7027-05 by using a scratch testing machine Scratch 4 manufactured by Surface Machine System, thereby forming a scratch of 60 mm in length at a rate of 100 mm/s. The load applied when the beginning of whitening of the surface of the specimen was confirmed visually was defined as a whitening load (unit: N). The higher the whitening load is, the better the scratch resistance is.

Examples 1 to 4, Comparative Examples 1 to 6

The blending proportions of a propylene polymer (A), a propylene polymer (B), and a nucleating agent (C) are given in the following Tables 1 and 2 where the total amount of the component (A) is taken as 100 parts by weight.

These were preliminarily mixed uniformly and then heated and melt-kneaded by using a 40-mm single screw extruder (manufactured by Tanabe Plastics Machinery Co., Ltd.) under the conditions defined by a cylinder set temperature of 220° C., a screw rotation speed of 100 rpm, and an extrusion rate of about 15 kg/hour, thereby producing a propylene polymer composition. The resulting composition was injection molded at a molding temperature of 220° C. and a mold temperature of 70° C. by using an injection molding machine SI30III manufactured by Toyo Machinery & Metal Co., Ltd., thereby affording a 2 mm thick polypropylene injection molded piece.

The physical properties of the resulting polypropylene injection molded articles are shown in the following Tables 1 and 2.

TABLE 1

|  | Examples | | | |
| --- | --- | --- | --- | --- |
|  | 1 | 2 | 3 | 4 |
| Formulation | | | | |
| A-1 parts by weight | 75 | | | |
| A-2 parts by weight | | 75 | | |
| A-3 parts by weight | | | 50 | 60 |
| B-1 parts by weight | 25 | 25 | 50 | 40 |
| C parts by weight | 0.1 | 0.1 | 0.1 | 0.1 |
| Physical properties | | | | |
| MFR g/10 minutes | 28.5 | 10.5 | 13.2 | 6.8 |
| Tensile elongation % | 1400 | 1429 | 1445 | 1331 |
| Whitening load N | 12.8 | 12.4 | 15.6 | 9.6 |

TABLE 2

|  | Comparative Examples | | | | | |
| --- | --- | --- | --- | --- | --- | --- |
|  | 1 | 2 | 3 | 4 | 5 | 6 |
| Formulation | | | | | | |
| A-1 parts by weight | 50 | | | | | |
| A-2 parts by weight | | 50 | | | | |
| A-3 parts by weight | | | 25 | | | |
| A-4 parts by weight | | | | 45 | | 25 |
| B-1 parts by weight | 50 | 50 | 75 | 55 | 80 | 75 |

TABLE 2-continued

| | Comparative Examples | | | | | |
|---|---|---|---|---|---|---|
| | 1 | 2 | 3 | 4 | 5 | 6 |
| B-2 parts by weight | | | | | 20 | |
| C parts by weight | 0.1 | 0.1 | 0.1 | 0.1 | 0.1 | 0.1 |
| Physical properties | | | | | | |
| MFR g/10 minutes | 38.8 | 30.8 | 24.2 | 5.1 | 120.6 | 18.7 |
| Tensile elongation % | 1384 | 1240 | 1610 | 1149 | 182 | 1451 |
| Whitening load N | 7.3 | 8.9 | 8.0 | 6.9 | 9.3 | 6.9 |

INDUSTRIAL APPLICABILITY

According to the present invention, it is possible to provide a propylene polymer molded article being high in tensile elongation and scratch resistance.

The invention claimed is:

1. A propylene polymer composition comprising a propylene polymer (A-1) or propylene polymer (A-2) defined below, a propylene polymer (B), and a nucleating agent (C), wherein the content of the propylene polymer (A-1) is 99.95 parts by weight to 55 parts by weight, the content of the propylene polymer (B) is 0.05 parts by weight to 45 parts by weight, and the content of the nucleating agent (C) is 0.001 parts by weight to 5 parts by weight, or the content of the propylene polymer (A-2) is 99.95 parts by weight to 30 parts by weight, the content of the propylene polymer (B) is 0.05 parts by weight to 70 parts by weight, and the content of the nucleating agent (C) is 0.001 parts by weight to 5 parts by weight where the total amount of the propylene polymer (A-1) or propylene polymer (A-2) and the propylene polymer (B) is taken as 100 parts by weight,

[Propylene polymer (A-1)]
   a polymer comprising not less than 90% by weight of monomer units derived from propylene where the whole amount of the polymer is taken as 100% by weight, and having an intrinsic viscosity, as measured in tetralin at 135° C., of from 1.2 dl/g, inclusive, to 1.7 dl/g, exclusive;

[Propylene polymer (A-2)]
   a polymer comprising not less than 90% by weight of monomer units derived from propylene where the whole amount of the polymer is taken as 100% by weight, and having an intrinsic viscosity, as measured in tetralin at 135° C., of from 1.7 dl/g, inclusive, to 2.9 dl/g, inclusive;

[Propylene polymer (B)]
   a polymer comprising not less than 90% by weight of monomer units derived from propylene where the whole amount of the polymer is taken as 100% by weight, and having an intrinsic viscosity, as measured in tetralin at 135° C., of from 0.5 dl/g, inclusive, to 1.1 dl/g, exclusive, wherein the nucleating nucleating agent (C) comprises at least one amide compound represented by formula (1):

$$R^2\text{—NHCO—}R^1\text{—CONH—}R^3 \quad (1)$$

wherein $R^1$ is a saturated or unsaturated aliphatic dicarboxylic acid residue having 1 to 24 carbon atoms, a saturated or unsaturated alicyclic dicarboxylic acid residue having 4 to 28 carbon atoms or an aromatic dicarboxylic acid residue having 6 to 28 carbon atoms; $R^2$ and $R^3$ are the same or different and are each a cycloalkyl group having 3 to 18 carbon atoms or a group represented by formula (a), formula (b), formula (c), or formula (d),

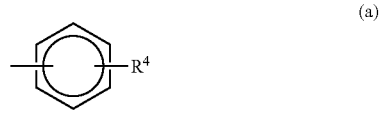

(a)

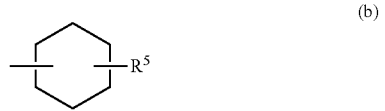

(b)

(c)

(d)

wherein $R^4$ represents a hydrogen atom, a linear or branched alkyl group having 1 to 12 carbon atoms, a cycloalkyl group having 6 to 10 carbon atoms, or a phenyl group; $R^5$ represents a linear or branched alkyl group having 1 to 12 carbon atoms; $R^6$ represents a linear or branched alkylene group having 1 to 4 carbon atoms; and $R^7$ represents a linear or branched alkylene group having 1 to 4 carbon atoms.

2. An injection molded article made of the propylene polymer composition according to claim 1.

* * * * *